United States Patent [19]

Young et al.

[11] Patent Number: 4,979,176
[45] Date of Patent: Dec. 18, 1990

[54] ACOUSTO-OPTICAL DEVICE WITH LITHIUM TANTALATE TRANSDUCER

[75] Inventors: Eddie H. C. Young, Melbourne, Fla.; James J. Jacob, Atherton, Calif.

[73] Assignees: Spectra-Physics, San Jose, Calif.; Newport Electro Optic Systems, Melbourne, Fla.

[21] Appl. No.: 276,613

[22] Filed: Nov. 28, 1988

[51] Int. Cl.$^5$ .......................... H01S 3/117; H01S 3/98
[52] U.S. Cl. ........................................ 372/13; 372/18
[58] Field of Search ...................... 372/13, 18; 350/358

[56] References Cited

U.S. PATENT DOCUMENTS

| | | | |
|---|---|---|---|
| 3,828,276 | 8/1974 | Cohen | 372/13 |
| 4,257,685 | 3/1981 | Barta et al. | 350/358 |
| 4,516,838 | 5/1985 | Bademian | 350/358 |
| 4,759,613 | 7/1988 | Fox | 350/358 |

OTHER PUBLICATIONS

R. C. Cunningham, "A Guide to Mode Locking", Electrooptical Systems Design, Apr. 1975.
Albrechet et al., "Building a Simple Reliable Low-Cost Modelocker System", Applied Optics, vol. 22, No. 9, 1 May 1983.
Rice et al., "A Barium Sodium Niobate Acousto-Optic Mode Locker/Frequency Doubler (AOML/FD) for Nd:YAG", Journal of Applied Physics, vol. 47, No. 7, Jul. 1976.

O. E. Mattiat, "Ultrasonic Transducer Materials", 1971, pp. 161–162.
A. W. Warner, et al., "Determination of Elastic and Piezoelectric Constants for Crystals in Class (3m)" Oct. 1966, Journal of the Acoustical Society of America, pp. 1223–1231.
J. J. Jacob, "Current Trends in AO Device Technology for Solid State Picosecond Laser Systems", Jan. 1987 (Reprint) The International Society for Optical Engineering, vol. 753, pp. 130–134.

Primary Examiner—William L. Sikes
Assistant Examiner—Georgia Y. Epps
Attorney, Agent, or Firm—Fliesler Dubb Meyer & Lovejoy

[57] ABSTRACT

An acousto-optical device includes a solid state substrate having optical characteristics affected by an acoustic wave in the substrate, and a Z-cut lithium tantalate transducer coupled to the substrate for inducing the acoustic wave. Lithium tantalate provides the transducer with a coupling coefficient and acoustic impedance mismatch which generate a very high finesse acoustic standing wave within the substrate. The lithium tantalate also provides low shear wave components with relatively high manufacturing tolerances. The acousto-optical device with a lithium tantalate transducer is also utilized as a high Q modelocker in a laser capable of producing short pulses of laser light.

25 Claims, 3 Drawing Sheets

ACOUSTO-OPTICAL DEVICE WITH LITHIUM TANTALATE TRANSDUCER

BACKGROUND OF THE INVENTION

1. Field of the Invention

The present invention relates to acousto-optical devices, particularly acousto-optical devices suitable for use as high Q modelockers in lasers.

2. Description of Related Art

High Q acousto-optical devices include a substrate, typically consisting of fused silica with an anti-reflective coating on the optical surfaces, which allows light to pass through the substrate along an optical path. As known in the art, Brewster-cut surfaces may replace anti-reflection coatings. A piezo-electric transducer coupled to the substrate induces a longitudinal acoustic wave that propagates through the optical path in the substrate. The acoustic wave causes variations in the optical properties of the substrate that predictably affect the light passing along the optical path and are useful for a variety of applications such as modelockers in lasers.

Transducers used in the prior art include lithium niobate ($LiNbO_3$), ceramic PZT or X-cut silica. Using lithium niobate transducers, high Q modelockers have been manufactured that allow for creation of laser pulses with widths of 70 to 80 picoseconds at drive powers of less than one watt.

Transducer properties which are important for standing wave acousto-optical devices include an optimum coupling coefficient of the transducer to the substrate, a low tendency of the transducer to generate shear waves in the substrate, and a high acoustic impedance mismatch between the transducer and the substrate.

A higher coupling coefficient allows for greater transfer of energy from the transducer to the substrate. The tendency to generate shear waves is caused by vibrations perpendicular to the direction of the longitudunal standing wave in the substrate. A higher acoustic impedance mismatch allows for greater reflection of the standing wave from the interface between the transducer and substrate.

The prior art transducers, lithium niobate and ceramic PZT, have coupling coefficients of 0.5 and 0.6, respectively. These relatively high coupling coefficients allow efficient transfer of energy both into and out of the fused silica substrate which can interfere with setting up good resonance in the substrate. In fact, when lithium niobate is used as the transducer, common practice involves setting up the oscillating modes above or below the fundamental frequency of the transducer to prevent over-coupling. The X-cut silica transducer has too low a coupling coefficient (0.095) which causes too narrow a bandwidth around its fundamental frequency and is thus difficult to manufacture.

It is desirable to have very high Q acoustic resonators applied as modelockers in lasers. A high Q in the acoustic resonator increases modulation content of the light signal in the modelocked laser so that many axial modes of the light are locked simultaneously, insuring a short pulse. Therefore, it is desirable to have a transducer for an acousto-optical device which combines the optimal coupling coefficient, low shear wave induction and high impedance mismatch properties to provide a very high Q resonator. Such an acousto-optical device would have a variety of applications, in addition to use as a modelocker.

SUMMARY OF THE INVENTION

The present invention provides an acousto-optical device comprising an optically isotropic solid state substrate having optical characteristics affected by an acoustic wave in the substrate, and a transducer coupled to the substrate for inducing the acoustic wave, wherein the transducer comprises lithium tantalate. Lithium tantalate provides the transducer with a coupling coefficient and acoustic impedance mismatch that provides for the generation of a very high finesse acoustic standing wave within the substrate. Furthermore, the lithium tantalate provides low shear wave components within relatively high manufacturing tolerances.

According to one aspect of the present invention, the acousto-optical device with a lithium tantalate transducer is utilized as a modelocker in a laser producing short pulses of laser light. Lithium tantalate provides low spurious shear wave component generation due to any transducer orientation misalignment. The low spurious acoustic wave component and high finesse help generate a more perfect switch for synchronizing modes in the laser, thus growing a narrower pulse.

DESCRIPTION OF THE PREFERRED EMBODIMENT

A detailed description of a preferred embodiment of the present invention is provided with respect to the figures. With respect to FIG. 1, implementation of the acousto-optical device of the present invention is described.

Figure 2:
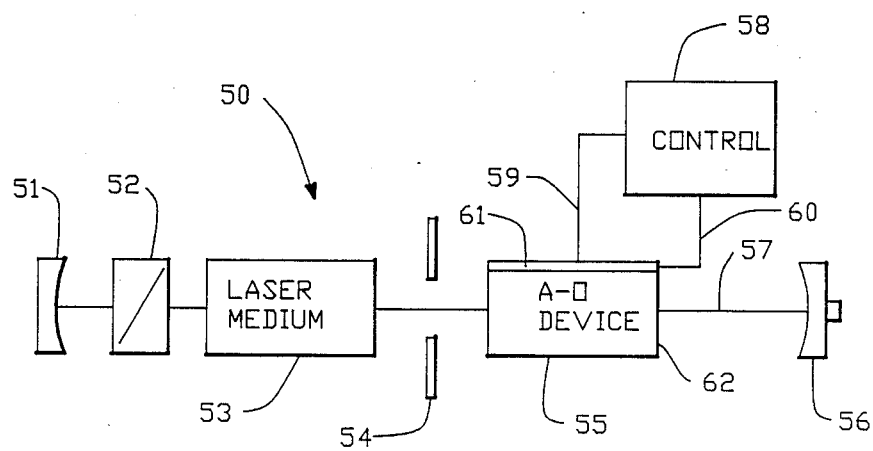
FIG. 2 is a schematic diagram of a modelocked laser using the acousto-optical device of the present invention.
Figure 5:
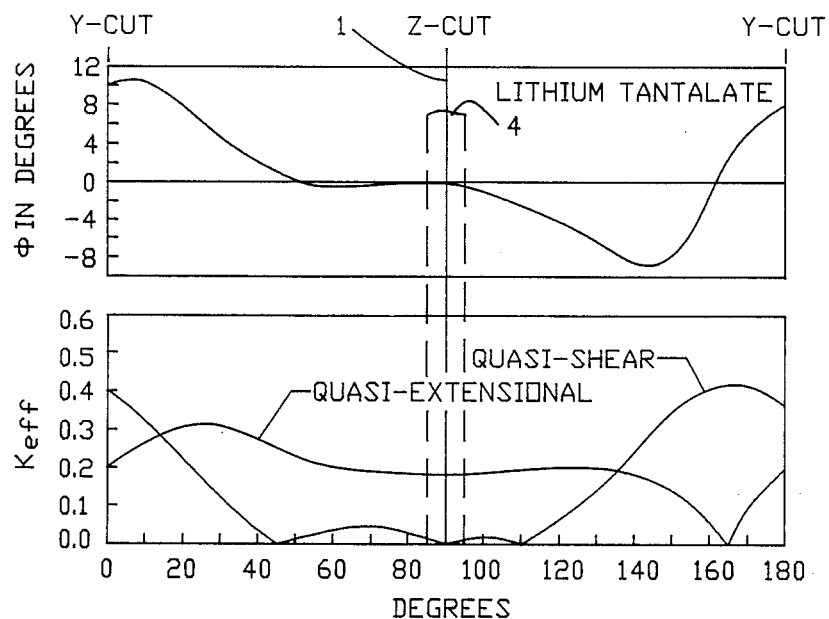
FIG. 5 is a graph showing properties of $LiTaO_3$.
Figure 6:
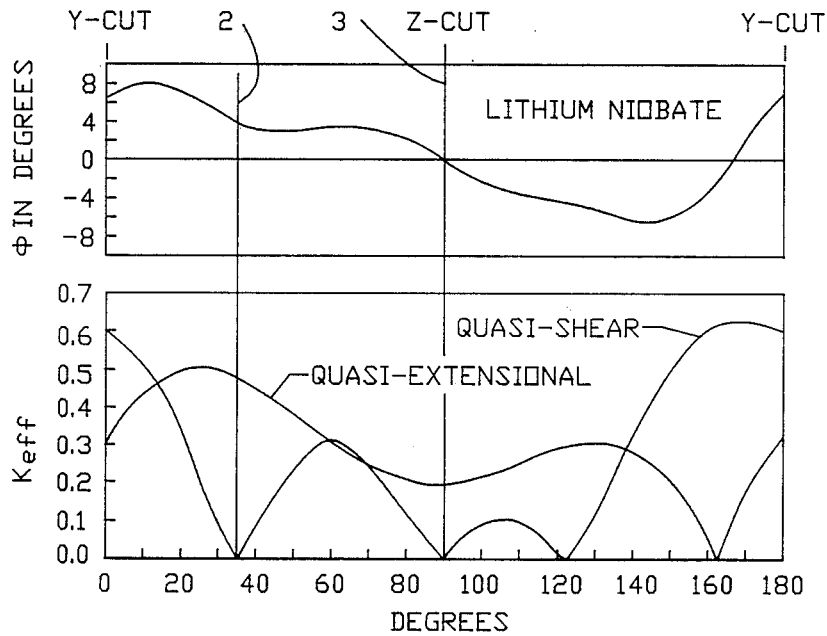
FIG. 6 is a graph showing properties of $LiNbO_3$ for contrast with FIG. 5.

FIG. 2 illustrates a modelocked laser that demonstrates one application of the acousto-optical device of the present invention. The dimensions of the acousto-optical device used in the modelocked laser of FIG. 2 are then described with reference to FIGS. 3 and 4. FIGS. 5 and 6 illustrate contrasting properties of lithium tantalate and lithium niobate, as an aid to understanding the present invention.

Figure 7:
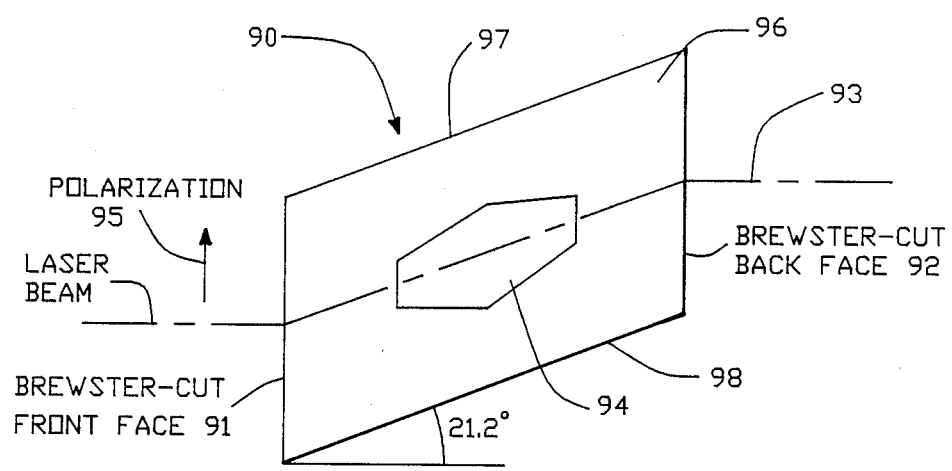
FIG. 7 illustrates an alternative embodiment of the acoustic optic device of the present invention.

An alternative design for an acousto-optical device according to the present invention is set out with reference to FIG. 7, where the substrate is formed with Brewster-cut faces in place of anit-reflective coatings.

Figure 1:
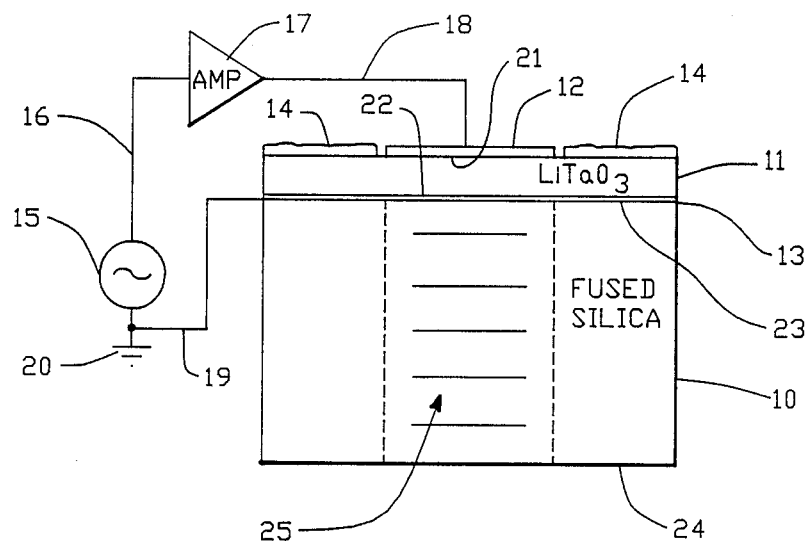
FIG. 1 is a schematic diagram of the acousto-optical device according to the present invention.

FIG. 1 shows a fused silica substrate 10 to which a Z-cut crystalline lithium tantalate plate 11 is bonded. A gold electrode 12 is formed on an electrode surface 21 of the the lithium tantalate plate 11 by vacuum deposition. The lithium tantalate plate 11 is bonded at a substrate coupling surface 22 to a transducer coupling surface 23 of the substrate 10 using an indium bonding technique such as described in Mattiat, *Ultrasonic Transducer Materials,* Plenum Press, New York 1971, pp. 161-162. The indium bonding technique provides a conducting layer 13 between the fused silica substrate 10 and the lithium tantalate plate 11.

An acoustic damping layer 14 is placed on the top surface 21 of the lithium tantalate plate 11 except over the electrode 12 in order to confine the creation of the acoustic wave to the area directly below the electrode 12. The acoustic damping material may be formed by silver epoxy having a random thickness.

An acoustic wave is induced in the substrate 10 by an oscillator 15 which is connected across line 16 to an amplifier 17 and to ground 20. The amplifier 17 is connected to the electrode 12 across wire 18. Wire 18 is bonded to the electrode 12 in a manner that avoids loading the transducer 11. In addition, the conducting layer 13 is coupled across wire 19 to ground 20.

The transducer plate 11 is lapped to a thickness close to the fundamental resonance so that the acoustic resonator impedance of the substrate matches the source impedance of the driver-amplifier 17.

Thus, the distance from the electrode surface 21 of the transducer plate 11 to the substrate bonding surface 22 matches the fundamental frequency of the fused silica substrate 10. The top or transducer bonding surface 23 of the substrate 10 is highly parallel to the bottom surface 24 of the substrate 10. Thus, when the oscillator 15 drives the transducer 11 at a fundamental frequency, a high finesse standing wave having nulls with good contrast is created within a column 25 in the substrate 10 beneath the electrode 12.

The properties of Z-cut lithium tantalate that allow it to provide a high finesse standing wave 25 within the substrate include its coupling coefficient, approximately 0.2, its very low shear component for Z-cut plates within relatively high manufacturing tolerance, and its high impedance mismatch with the fused silica substrate 10. The coupling coefficient of lithium tantalate is less than the 0.5 coefficient of lithium niobate, but greater than the 0.095 coefficient of the X-cut silica. Thus, lithium tantalate is less likely to suffer an overcoupled situation than are lithium niobate or other higher coefficient materials, while having a sufficient bandwidth around its fundamental frequency so that manufacturing tolerances are acceptable.

One acousto-optical device which is important to laser users is the modelocker. The modelocker creates short pulses which are useful for a wide range of scientific and analytic applications. The advantage of Z-cut lithium tantalate as a transducer is that laser pulses can be formed which are a factor of two shorter than are available with prior art technology.

The acousto-optical device operates by translating an electrical signal supplied at the electrode 12 into an acoustic signal which propagates into the fused silica substrate 10. The fused silica substrate has extremely parallel faces along the acoustic beam path and thus, after the beam travels through the substrate and hits the free end 24, it is reflected back toward the transducer interface 23, where it is again reflected back toward the free end 24.

At the transducer interface 23, an impedance mismatch is critical to a high finesse standing wave. A high impedance mismatch is necessary so that a substantial portion of the acoustic energy is reflected back to the substrate 10 rather than transmitted through the transducer 11. An acoustic wave traveling in fused silica will reflect 1.4 times more energy at a lithium tantalate interface than would be reflected by the same wave when the transducer material is lithium niobate, which is most commonly used in the prior art. Thus, the high impedance mismatch results in a high acoustic Q for the transducer. Of course, reflection from the free end 24 of the substrate is nearly infinite due to the dissimilar material properties of fused silica and air.

In the modelocker application, a very high finesse acoustic resonator will couple many axial modes of the laser simultaneously insuring a short pulse.

FIG. 2 is a schematic diagram of a modelocked laser 50 according to the present invention. The laser 50 includes a high reflecting mirror 51, a polarizer 52, a laser medium 53, an aperture 54, an acousto-optical device 55 and an output coupler 56, all mounted along an optical path 57. The acousto-optical device 55 is driven by control circuitry 58 across lines 59 and 60. Such a laser system is commercially available as a Model 3800 laser from Spectra-Physics of San Jose, California. The Model 3800 uses, however, a lithium niobate transducer. According to the present invention, the acousto-optical device 55 of the laser system is modified to include a Z-cut lithium tantalate transducer 61 and a fused silica substrate 62.

The laser medium is preferably a Nd:YAG rod. The aperture 54 is adapted to suppress all transverse modes other than $TEM_{00}$, as is well known in the art.

The control 58 is adapted to modulate the laser light at 82 MHz by driving the transducer 61 at 41 MHz. This creates a standing wave at 82 MHz within the substrate 62. An 82 MHz standing wave allows one pulse every 12 nanoseconds at a very narrow pulse width. It is found that by running the system described in FIG. 2 at 10 watts, a pulse less than 40 picoseconds is achieved using a Z-cut lithium tantalate transducer.

Figure 3:
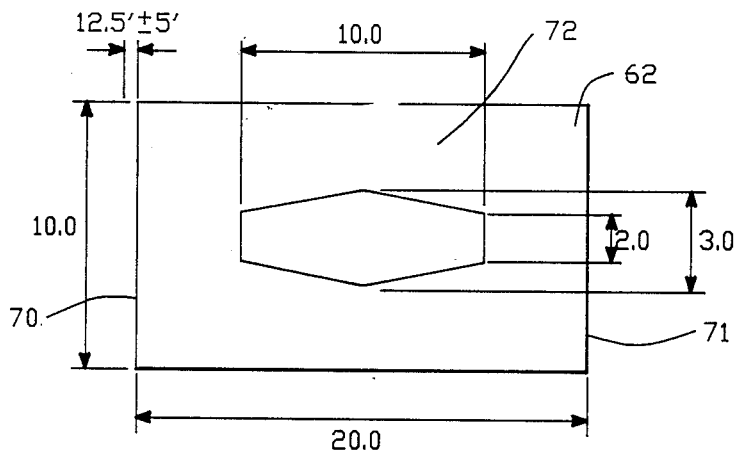
FIG. 3 is a top view of one implementation of the acousto-optical device showing the electrode geometry and the shape of the substrate.

The dimensions of the acousto-optical device 55 used in the laser of FIG. 2 are shown in FIG. 3. The substrate 62 is formed of fused silica, approximately 10×20×10 mm. The optical faces 70 and 71 are provided with an anti-reflective coating. One of the optical surfaces 70 is wedged at 12.5 minutes±5 minutes in order to prevent etalon effects within the substrate 62.

An electrode 72 is formed having a dual trapezoidal shape. The dual trapezoidal shape is approximately 10 mm in length and 3 mm at the widest point at the center of the electrode bonding surface of the substrate 62. The narrow ends of the electrode 72 are approximately 2 mm wide.

Figure 4:
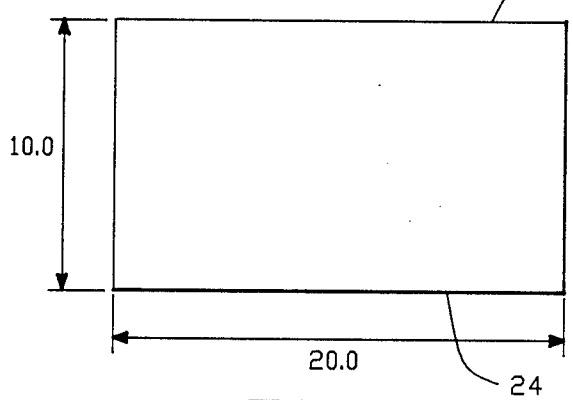
FIG. 4 is a side view of the substrate of the implementation shown in FIG. 3.

As illustrated in FIG. 4, the substrate is 20 mm long and 10 mm deep. The surfaces 23 and 24 are parallel to within five arcseconds to provide for the high finesse standing wave.

In the preferred system, the substrate material is fused silica, Schlieren grade. The optical surfaces are coated with a hard V anti-reflective coating for high transmission at 1.06 microns. Reflection losses are less than 0.5 per cent at 0° angle of incidence. The scatter and absorption of the substrate are less than 0.5 per cent. The coating must be splatter and speckle-free. The coating must handle a power density of 50 Mwatt/$cm^2$ peak, with an average of 50 Kw/$cm^2$.

The $LiTaO_3$ transducer thickness is 0.69 mm.±0.001 mm.

Wire leads are attached to electrode and ground plane. Silver epoxy is used around the electrode area for damping characteristics. The silver epoxy is Ablestik 16-1, commercially available from Ablestik, 833 West 182nd Street, Gardena, California 90248.

All edges of the substrate have protective bevels. The sides of the substrate are ground surfaces.

The pulses with a lithium tantalate acousto-optical device are shorter than the pulses in prior art systems because the resonance is very sharp, imposing strong harmonic modulation on the light beam passing through the substrate 62. By harmonic modulation is meant that the modulation is rich in higher harmonics of the fundamental drive frequency of the transducer, which results in coupling many more laser axial modes than is possible in the prior art. By coupling more axial modes, the resulting pulses are much shorter.

FIG. 5 is a graph from Warner et al., "Determination of Elastic and Piezoelectric Constants for Crystals in Class (3m)," *The Journal of the Acoustical Society of America*, 1968, p.1223, showing the coupling coefficient $K_{eff}$ and power flow angle $\phi$ for lithium tantalate. It can be seen that the Z-cut lithium tantalate at point 1 has a low, power flow angle $\phi$ within a relatively broad tolerance 4 of ±5 degrees around the Z axis, while the shear component of the coupling coefficient is very low around that same tolerance 4. Realistically, the transducer plate should be cut to as close to the Z-cut axis as practical. Also, around the Z axis, the coupling coefficient of the extensional or longitudinal wave is about 0.2 and relatively constant. This combination of characteristics, when added to the impedance mismatch between lithium tantalate and the fused silica substrate, provides an ideal material for the high finesse acousto-optical device of the present invention.

By contrast, FIG. 6, also from Warner et al., illustrates the same properties for the most commonly used transducer of the prior art, lithium niobate. The most common lithium niobate transducer is cut at about 36° from the Y-cut illustrated at the point 2 in the graph. It can be seen that the shear wave is very low at 36°, but with very small tolerances increases rapidly away from that point.

A similar problem exists along the Z-cut axis 3 for lithium niobate. Further, the power flow angle $\phi$ is not low at the 36° cut and is changing rapidly in the range around the Z cut. Therefore, it is difficult to manufacture a quality lithium niobate transducer.

FIG. 7 illustrates an alternative embodiment of the acoustic optical device according to the present invention from the same perspective as FIG. 3. The device 90 is a fused silica block with a Brewster-cut front face 91 and a Brewster-cut back face 92. The laser beam follows an optical path 93 through the acoustic column below electrode 94. Polarization of the laser beam for this embodiment is shown at arrow 95 for the mode locker application as discussed above. As indicated by electrode 94, the lithium tantalate plate 96 is mounted on the transducer coupling surface. The fused silica block 90 has a first side 97 and a second side 98 which are essentially parallel to the optical path through the block and perpendicular to the transducer coupling surface.

Conclusion

Although the acousto-optical device of the present invention is particularly suited for use as a modelocker in a laser, other applications could include a Bragg cell for use in acousto-optic correlators and spectrum analyzers.

The foregoing description of the preferred embodiments of the present invention have been presented for purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An acousto-optical device comprising:
   an optically isotropic solid state substrate having optical characteristics affected by an acoustic wave within the substrate;
   a transducer, coupled to the substrate, for inducing the acoustic wave within the substrate, the transducer comprising lithium tantalate ($LiTaO_3$).

2. The device of claim 1, wherein the substrate comprises fused silica.

3. The device of claim 1, wherein the substrate includes a front surface, a back surface, a transducer coupling surface, an acoustic reflecting surface opposite the transducer coupling surface, a first side surface and a second side surface; and further including an anti-reflective coating on the front surface and the back surface.

4. The device of claim 3, wherein the transducer is bonded to the transducer coupling surface and induces a standing acoustic wave in the medium with a direction of propagation from the transducer coupling surface to the acoustic reflecting surface.

5. The device of claim 1, wherein the transducer comprises a crystalline plate consisting essentially of lithium tantalate, with an electrode surface and a substrate coupling surface.

6. The device of claim 5, wherein the crystalline plate has a Z crystalline axis and is cut so that the electrode surface and substrate coupling surface are perpendicular to the Z crystalline axis within a tolerance of plus or minus five degrees.

7. The device of claim 5, further including an electrode delivering oscillating current to the transducer bonded to the electrode surface of the crystalline plate.

8. The device of claim 7, wherein the electrode has a dual-trapezoidal shape in a plane parallel to the electrode surface.

9. The device of claim 1, wherein the substrate includes a front surface, a back surface, a transducer coupling surface, an acoustic reflecting surface opposite the transducer coupling surface, a first side surface and a second side surface; and wherein the front surface and back surface are Brewster-cut.

10. The device of claim 9, wherein the transducer is bonded to the transducer coupling surface and induces a standing acoustic wave in the medium with a direction of propagation from the transducer coupling surface to the acoustic reflecting surface.

11. A laser, comprising:
   a first optical element and a second optical element defining an optical path;
   a laser medium mounted along the optical path between the first optical element and the second optical element;
   a modelocker including an optically isotropic solid state substrate, mounted between the laser medium and the second optical element, having optical characteristics affected by an acoustic wave within the substrate, and a transducer, coupled to the substrate, for inducing the acoustic wave within the substrate, the transducer comprising lithium tantalate (LiTaO$_3$).

12. The laser of claim 11, wherein the substrate comprises fused silica.

13. The laser of claim 11, wherein the substrate includes a front surface, a back surface, a transducer coupling surface, an acoustic reflecting surface opposite the transducer coupling surface, a first side surface and a second side surface; and further including an anti-reflective coating, on the front surface and the back surface.

14. The laser of claim 13, wherein the transducer is bonded to the transducer coupling surface and induces a standing acoustic wave in the medium with a direction of propagation from the transducer coupling surface to the acoustic reflecting surface.

15. The laser of claim 11, wherein the transducer comprises a crystalline plate consisting essentially of lithium tantalate, with an electrode surface and a substrate coupling surface.

16. The laser of claim 15, wherein the crystalline plate has a crystalline axis and is cut so that the electrode surface and the substrate coupling surface are perpendicular to the Z crystalline axis within a tolerance of plus or minus five degrees.

17. The laser of claim 11, further including means for suppressing transverse modes of oscillation other than TEM$_{00}$.

18. The laser of claim 11, wherein the substrate includes a front surface, a back surface, a transducer coupling surface, an acoustic reflecting surface opposite the transducer coupling surface, a first side surface and a second side surface; and
    wherein the front surface and back surface are Brewster-cut.

19. The laser of claim 18, wherein the transducer is bonded to the transducer coupling surface and induces a standing acoustic wave in the medium with a direction of propagation from the transducer coupling surface to the acoustic reflecting surface.

20. An apparatus for coupling a plurality of axial modes within a laser cavity to produce pulses of laser output, comprising:
    an optically isotropic medium having optical characteristics affected by a standing acoustic wave in the medium, the medium having a first surface and a second surface parallel to the first surface, and being mounted within the laser cavity so that the plurality of axial modes pass along an optical path through the medium between the first surface and the second surface;
    a transducer, coupled to the first surface of the medium, for inducing in response to an excitation signal, a standing acoustic wave within a column between the first surface and the second surface of the medium, the transducer comprising lithium tantalate (LiTaO$_3$), and
    means, coupled to the transducer, for supplying the excitation signal.

21. The apparatus of claim 20, wherein the medium comprises fused silica.

22. The apparatus of claim 20, wherein the transducer is formed by a crystalline plate consisting essentially of lithium tantalate, with an electrode surface and a substrate coupling surface.

23. The apparatus of claim 22, wherein the crystalline plate has a crystalline axis and is cut so that the electrode surface and the substrate coupling surface are perpendicular to the Z crystalline axis within a tolerance of plus or minus five degrees.

24. The apparatus of claim 20, wherein the optical path traverses a third surface and a fourth surface of the medium, and further including anti-reflective coatings on the third surface and the fourth surface.

25. The apparatus of claim 20, wherein the optical path transverses a third surface and a fourth surface of the medium, and wherein the third surface and fourth surface are oriented at a Brewster angle relative to the optical path.

* * * * *